United States Patent [19]

Popov

[11] 4,047,449
[45] Sept. 13, 1977

[54] GLOBOID WORM GEARING AND METHOD OF MAKING GLOBOID WORM THEREOF

[76] Inventor: Valentin Alexeevich Popov, ulitsa Tsjurupy, 6, korpus 4, kv. 57, Moscow, U.S.S.R.

[21] Appl. No.: 653,454

[22] Filed: Jan. 29, 1976

[51] Int. Cl.$^2$ .................. F16H 55/04; F16H 1/16; F16H 1/20
[52] U.S. Cl. .................................. 74/458; 74/425
[58] Field of Search .................. 74/458, 425

[56] References Cited

U.S. PATENT DOCUMENTS 2,935,887   5/1960   Wildhaber .................... 74/458

*Primary Examiner*—Leonard H. Gerin
*Attorney, Agent, or Firm*—Fleit & Jacobson

[57] ABSTRACT

The invention relates to gear drives. The globoid worm gearing comprises a cylindrical worm-wheel in mesh with a globoid worm. The side surfaces of the thread of said globoid worm are shaped so as to envelop the side surfaces of the worm-wheel teeth with the result that in the process of successive engagement of the worm thread with the worm-wheel teeth the worm thread makes a linear contact throughout the side surface of the worm-wheel teeth. Said globoidal gearing is capable of transmitting larger torques and possesses a greater kinematic accuracy than like-size modified globoid worm gears known in the prior art.

A method of making the globoid worm is provided whereby the worm is generated through relative movements of the worm blank and a rotary cutter and thereafter the side surfaces of the worm thread are finished by honing. The cutting edges of the rotary cutter are located on a generating surface having the shape of the side surfaces of the cylindrical worm-wheel teeth. The finishing is effected by means of a hone with teeth whose side surfaces are identical with the side surfaces of the cylindrical worm-wheel teeth.

4 Claims, 4 Drawing Figures

GLOBOID WORM GEARING AND METHOD OF MAKING GLOBOID WORM THEREOF

The present invention relates to gear drives and has particular reference to globoid worm gearing and methods of making globiod worms. It may be used with advantage in worm-type reduction gears, machine-tool gear trains, indexing mechanisms, and particularly in applications requiring high load-carrying capacity, i.e. where it is necessary to transmit large torques through small-size globiod worm gearing.

It is also advantageous to use the invention in mechanisms which need high kinematic accuracy of operation for a long time, for example, in the indexing and carriage drives of a gear-tooth generating machine.

Widely known are a classical and a modified globoid worm gear wherein the side surfaces of the thread of the globoid worm make linear contact with the side surfaces of the worm-wheel teeth.

The classical globoid worm gearing is characterized by constant circular pitch of the worm thread.

This gearing suffers mainly from the disadvantage that the contact surface is small due to substantial undercutting of the side surfaces of the worm-wheel teeth, the undercut zones reaching 80 to 90 percent of the tooth facewidth. Therefore, in the classical globoid worm gearing, the enveloping zone of the side surface of the worm-wheel teeth which is in direct contact with the worm thread approximates only to 15 percent of the entire side surface of the worm-wheel tooth, this disadvantage limiting the load-carrying capacity of the gearing under construction.

In the modified globoid worm gearing, the thread of the globoid worm has a variable circular pitch. In consequence, the enveloping zone on the side surfaces of the worm-wheel teeth is increased, reaching 30 percent of the entire worm-wheel tooth surface. This indicates that the globoid worm gearing has a reserve of load-carrying capacity for increasing the enveloping zone at the expense of the undercut zones on the side surfaces of the worm-wheel teeth.

Besides, the modified globoid worm gearing suffers from instability of the initial geometry of the side surfaces of the worm-wheel teeth because in the course of working-in and operation of the gearing the enveloping zone on the wheel tooth increases at the expense of the undercut zones. However, a negative phenomenon is attendant upon this process, viz. a cyclic error develops on the side surface of the globoid worm thread, which gives rise to vibration of the gearing and materially affects the kinematic accuracy of the drive.

Another disadvantage of the globoid worm gears known in the prior art is that the worm thread engages the wheel teeth with an impact which adversely affects the kinematic accuracy of the drive. In this connection, to reduce vibration of such gearing, additional manufacturing processes are resorted to in order to gradually lower the thread at both ends of the globoid worm.

It will be noted that the globoid worm gearing production methods known in the prior art call for knowledge of the amount and nature of the modification, need special production outfit and tools, and require correction of the machine-tool setup, which considerably complicates the manufacture of globoid worm gearing.

Moreover, the making of a globoid hob for cutting globoid worm-wheel teeth is a labour-consuming and costly process.

It is an object of the present invention to provide globoid worm gearing and a method of making the globoid worm thereof with a view to increasing load-carrying capacity of the gearing, reducing its liabilty to vibration, cutting down the need for manufacturing labour and material, improving the quality, operational dependability and durability of the gearing, and at the same time simplifying and cheapening the production thereof.

It is a further object of the present invention to improve the stability of the geometric form of the side surfaces of the worm thread and wheel teeth, and also to eliminate the cause of cyclic error arising in the globoid worm in the course of operation of globoid gearing.

It is a still further object of the present invention to reduce the susceptibility of the globoid gearing to faults in workmanship and assembly.

These and other objects are achieved by providing globoid gearing in which the side surfaces of the thread of the globoid worm and of the worm-wheel teeth in mesh are in linear contact.

According to the invention, the worm-wheel is cylindrical and the side surfaces of the thread of the globoid worm are shaped so as to envelop the side surfaces of the teeth of said cylindrical worm-wheel with the result that in the process of successive engagement of the globoid worm thread with the teeth of the cylindrical worm-wheel said thread makes linear contact throughout the entire side surface of said teeth.

This constructional arrangement makes it possible to increase the load-carrying capacity of the globoid worm gearing by extending the enveloping zone over the entire side surface of the worm-wheel teeth, which increases the contact surface of the globoid worm gearing and reduces the unit pressures exerted on the enveloping side surfaces of the worm-wheel teeth. In consequence, the globoid worm gearing which constitutes the present invention can transmit by far larger torques than like-size globoid worm gears known in the prior art.

Inasmuch as the side surfaces of the teeth of the cylindrical worm-wheel are concave with respect to the convex side surface of the globoid worm thread in the direction of the worm helix, and said side surfaces of the wheel teeth have no undercut zones throughout the facewidth thereof, the gearing is less liable to vibration, the stability of the geometric form of the side surfaces of the worm thread and worm-wheel teeth is improved, and the cause of cyclic error arising in the worm during prolonged operation is eliminated. All these features ensure high kinematic accuracy of the gearing.

It is appropriate that the facewidth of the teeth of the cylindrical worm-wheel be substantially equal to the root diameter of the throat of the globoid worm.

This constructional arrangement makes it possible to decrease the facewidth of the cylindrical worm-gear approximately 30 percent and also materially increase the number of the worm-wheel teeth meshing with the worm thread at a time, as compared with the globoid gears known in the prior art. This feature also increases the load-carrying capacity of the globoid worm gearing constituting the present invention.

The present invention also covers a method of making the globoid worm of the globoid gearing involved. With this method, the globoid worm is generated through relative motions of the worm blank and a rotary cutting tool and thereafter the side surfaces of the worm thread are finished. According to the invention, the cutting edges of the teeth of said rotary cutting tool are located on a generating surface having the shape of the side surfaces of the worm-wheel teeth, and the finishing is made by means of a hone with teeth whose side surfaces are also indentical with the side surfaces of said worm-wheel teeth.

Said method of making the globoid worm of the gearing constituting the present invention makes it possible to obviate all the production operations involved in the modification of the globoid worm inasmuch as the surface generating the worm thread is identical with the side surface of the teeth of the associated cylindrical worm-wheel, said side surface of the worm-wheel teeth being free from undercut zones.

Honing the side surfaces of the globoid worm thread provides for high quality of manufacture, giving a surface finish of approximately Class 10 to 12.

The width of the cutter and hone may be essentially larger than the facewidth of the worm-wheel by the amount necessary to localize the contact spot in the given gearing.

This constructional arrangement decreases the susceptibility of the gearing to faults in workmanship and assembly.

Now the invention will be described in detail with reference to the accompanying drawings in which.

Figure 1:
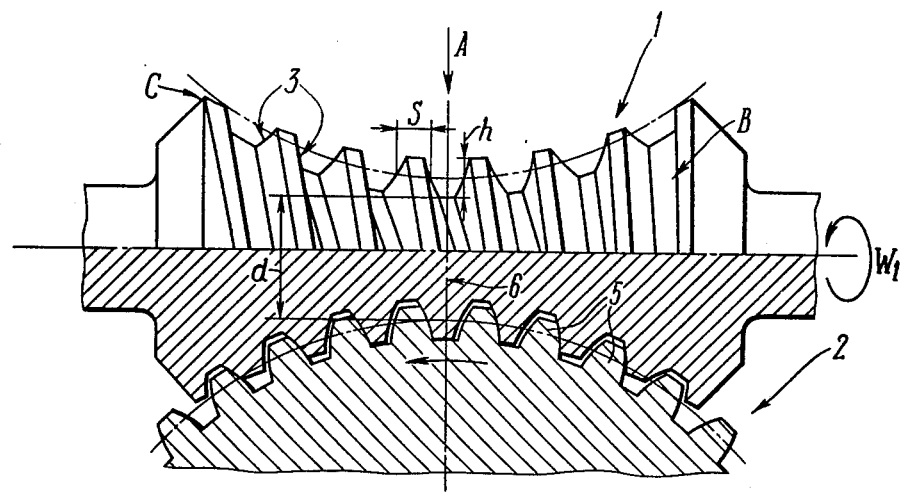
FIG. 1 is a part-sectional view of the globoid worm gearing according to the invention.
Figure 2:
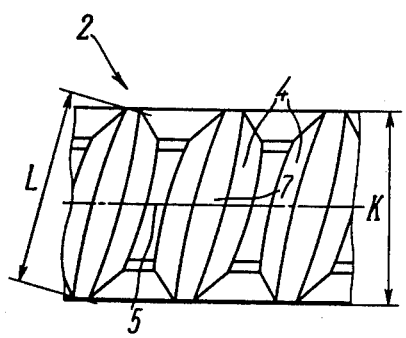
FIG. 2 is a view of the worm-wheel in the direction of the arrow A in FIG. 1 (the worm is not shown).

The globoid worm gearing comprises a globoid worm 1 (FIG. 1) in mesh with worm-wheel 2. The side surfaces 3 of the thread of globoid worm 1 and the side surfaces 4 (FIG. 2) of the teeth 2 of worm-wheel 2 make linear contact.

According to the invention, the worm-wheel 2 is cylindrical and the side surfaces 3 of the thread of the globoid worm 1 are shaped so as to envelop the side surfaces 4 of the teeth 5 of the cylindrical wheel 2.

The side surfaces 4 of the worm-wheel teeth 5 are concave in the direction of the thread helix of worm 1, being free from undercut zones across the entire facewidth L of the teeth 5. In consequences, during the process of successive engagement of the thread of globoid worm 1 with the teeth 5 of the cylindrical wormwheel 2, said worm thread makes linear contact throughout the side surface 4 of the worm-wheel teeth 5.

The thread of the globoid worm 1 gradually diminishes in height $h$ and thickness S from the worm throat 6 toward the worm ends, which obviates vibration when the teeth 5 of the worm-wheel 2 engage with and disengage from the thread of globoid worm 1 at the entering end B and leaving end C.

According to the invention, the facewidth L of the worm-wheel teeth 5 is substantially equal to the diameter $d$ of the worm throat 6 at the thread root 7.

Figure 3:
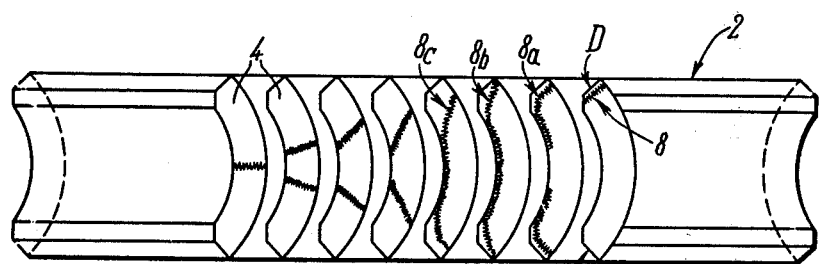
FIG. 3 shows the same as FIG. 2 (the side surfaces of the worm-wheel teeth are shown coinciding with the plane of the drawing).

The globoid worm gearing which constitutes the present invention operates as follows:

When the drive (not shown) is put in work, the globoid worm 1 rotates with angular velocity $W_1$ and the left side surface 2 (FIG. 1) of the worm thread at the entering end "B" comes into contact with the leaving side E of the worm-wheel tooth 5 on a line 8 (FIG. 3). Thereafter the next worm-wheel teeth 5 successively engage with the worm thread on contact lines 8a, 8b, 8c, etc., the thread of the globoid worm 1 making linear contact with the teeth 5 of the cylindrical worm-wheel 2 throughout the tooth side surface 4.

This condition increases the total length of the contact lines 8-8c between the side surface 3 of the worm thread and the side surface 4 of the worm-wheel teeth which are in mesh at a time, which reduces unit pressures and, consequently, increases the load-carrying capacity of the gearing without increase in its size.

According to the invention, the method of making the globoid worm 1 consists in generation through relative motions of the worm blank and a rotary cutting tool, whereupon the side surfaces of the worm thread are finished.

The tool cutting edges designed to form the side surfaces 3 of the worm thread are located on a generating surface 9 having the shape of the side surfaces 4 of the teeth 5 of the cylindrical worm-wheel 2.

The herein described method of making the globoid worm 1 features high efficiency.

According to the invention, the finishing the worm thread side surfaces 3 is effected by means of a hone with teeth whose side surfaces are indentical with the side surfaces 4 of the worm-wheel teeth 5.

Figure 4:
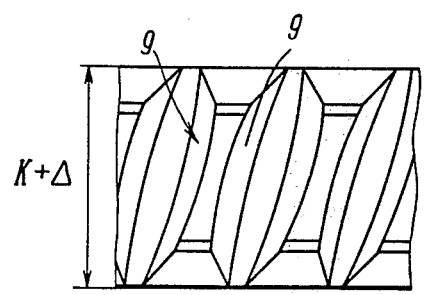
FIG. 4 shows a portion of the generating surface of the cutter and the hone for making and finishing the globoid worm.

According to the invention, the width K + Δ (FIG. 4) of the cutter and hone is larger than the facewidth K of the cylindrical worm-wheel 2 by the amount Δ necessary to localize the contact spot in the given globoid gearing.

It is desierable that the hone be made of vulcanitebonded abrasive material. Such hones are simple to make and provide for high accuracy and finish of the side surfaces of the globoid worm thread.

The cylindrical worm-wheel for the globoid worm gearing involved can be made by any method known in the art, which condition is very instrumental in reducing the manufacturing cost of the gearing.

The production of the globoid worm gearing which constitutes the present invention may be particularly advantageous for large-series manufacturers of cylindrical worm gearing since they will only have to introduce the production of globoid worms, no changes being needed for the production of cylindrical worm-wheels. It will be noted that the facewidth of the cylindrical worm-wheels, which are made of costly tin bronze, will be decreased approximately 30 percent, whilst the load-carrying capacity of the gearing will increase several times.

What is claimed is:

1. A globoid worm gearing comprising: a cylindrical worm-wheel having a plurality of teeth with side surfaces, a globoid worm having a thread with side surfaces and a throat, the side surfaces of the thread of said globoid worm shaped to envelop the side surfaces of the teeth of said cylindrical worm-wheel, means for meshing said worm-wheel with said globoid worm and for engaging the thread of said globoid worm with the teeth of said cylindrical worm-wheel such that said worm thread makes a linear contact throughout the entire side surface of said worm-wheel teeth wherein the contact surface of the globoid worm gearing comprises the contact surface of the cylindrical worm-wheel; the contact lines of the cylindrical worm-wheel envelop the entire side surface of the worm-wheel teeth, while the contact lines of the globoid worm gearing occupy only the medium portion of the tooth side surface, said contact lines on the worm-wheel teeth intersect on the side surface of the working wheel teeth during successive engagement of the globoid worm thread with the teeth of the cylindrical worm-wheel.

2. A globoid worm gearing as claimed in claim 1, in which the facewidth of the teeth of said cylindrical wormwheel is substantially equal to the root diameter of the thread at the throat of the globoid worm.

3. A globoid worm gearing as claimed in claim 1, wherein said cylindrical worm-wheel teeth side surfaces are concave in the direction of the thread helix of said globoid worm.

4. A globoid worm gearing as claimed in claim 1, wherein the said globoid worm thread has a height which gradually diminishes from the throat of the worm to the ends of the worm, and has a thickness between its side edges which gradually diminishes from the throat of the worm to the ends of the worm.

* * * * *